(12) United States Patent
Son et al.

(10) Patent No.: US 9,002,555 B2
(45) Date of Patent: Apr. 7, 2015

(54) ELECTRIC BICYCLE DRIVING APPARATUS

(71) Applicant: Mando Corporation, Gyeonggi-do (KR)

(72) Inventors: Hong Youp Son, Gyeonggi-do (KR); Sang Hoon Han, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 93 days.

(21) Appl. No.: 13/682,476

(22) Filed: Nov. 20, 2012

(65) Prior Publication Data
US 2014/0081495 A1    Mar. 20, 2014

(30) Foreign Application Priority Data
Sep. 19, 2012  (KR) .......................... 10-2012-0104169

(51) Int. Cl.
*B60L 9/00*     (2006.01)
*B60L 11/00*    (2006.01)
(Continued)

(52) U.S. Cl.
CPC .............. *B60L 15/20* (2013.01); *B60L 11/007* (2013.01); *B60L 15/2045* (2013.01); *B60L 2200/12* (2013.01); *Y02T 10/70* (2013.01)

(58) Field of Classification Search
CPC ......... B60L 7/10; B60L 11/007; B60L 15/20; B60L 2210/14; B60L 11/123; B60L 11/14; B60L 3/12; B60L 11/02; B60L 11/12; B62M 5/50; B62M 5/45; B62M 23/02; B62M 11/145; B62M 3/12; B62M 6/50; B62M 6/45; B62M 9/04; B62M 6/75; G11B 21/083; G11B 5/5521; G11B 7/0953; H02P 6/08; H02P 6/00; H02P 6/22; H02K 21/24; H02K 29/06; H02K 7/10; H02K 7/108; H02K 7/1162; Y02E 60/122; Y02E 60/126; Y02E 11/007; H01M 10/615; H01M 10/63; H01M 2/20; H01M 2/10

USPC .................... 701/22, 25, 23, 29.6, 43, 70, 53; 318/34; 180/206.4, 227, 65.6, 220, 180/206.2, 205.1, 226, 223; 455/69, 41.1, 455/437, 522, 573, 574
See application file for complete search history.

(56) References Cited

U.S. PATENT DOCUMENTS 3,921,745 A * 11/1975 McCulloch et al. ....... 180/206.1
5,226,501 A *  7/1993 Takata ....................... 180/206.2
(Continued)

FOREIGN PATENT DOCUMENTS

DE     19617959 C1 * 10/1997
EP     2562523 A1 *  2/2013
JP     2001008480 A *  1/2001 ............... H02P 6/06

*Primary Examiner* — Calvin Cheung
*Assistant Examiner* — Luis A Martinez Borrero
(74) *Attorney, Agent, or Firm* — McDermott Will & Emery LLP (57) ABSTRACT

An electric-bicycle driving apparatus includes a speed change mode operator to output a low-speed mode signal or a high-speed mode signal, a controller to receive the low-speed mode signal or high-speed mode signal outputted from the speed change mode operator and to output a first control signal corresponding to the low-speed mode signal or a second control signal corresponding to the high-speed mode signal, a generation-signal provider to provide a generation signal outputted from a generator, and a stepping operation load booster to boost a load of the generation signal outputted from the generation-signal provider by receiving the first control signal or second control signal when the speed change mode operator outputs the low-speed mode signal or high-speed mode signal, and to send a stepping operation provider a resulting signal of the boost in a stepping operation signal corresponding to the low-speed mode signal or high-speed mode.

21 Claims, 6 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60L 15/20* (2006.01)

(56) References Cited

U.S. PATENT DOCUMENTS

| | | | | |
|---|---|---|---|---|
| 5,316,101 A * | 5/1994 | Gannon | | 180/221 |
| 5,491,390 A * | 2/1996 | McGreen | | 318/5 |
| 5,599,244 A * | 2/1997 | Ethington | | 474/70 |
| 5,806,621 A * | 9/1998 | Soda et al. | | 180/206.4 |
| 5,865,267 A * | 2/1999 | Mayer et al. | | 180/206.5 |
| 6,011,366 A * | 1/2000 | Murakami et al. | | 318/1 |
| 6,012,538 A * | 1/2000 | Sonobe et al. | | 180/220 |
| 6,039,137 A * | 3/2000 | Schless | | 180/220 |
| 6,080,073 A * | 6/2000 | Liu et al. | | 475/4 |
| 6,148,944 A * | 11/2000 | Adomi et al. | | 180/220 |
| 6,196,347 B1 * | 3/2001 | Chao et al. | | 180/206.2 |
| 6,296,072 B1 * | 10/2001 | Turner | | 180/220 |
| 6,320,336 B1 * | 11/2001 | Eguchi | | 318/139 |
| 6,446,745 B1 * | 9/2002 | Lee et al. | | 180/206.2 |
| 6,531,838 B2 * | 3/2003 | Parks | | 318/139 |
| 6,554,730 B1 * | 4/2003 | Sakai et al. | | 475/195 |
| 6,629,574 B2 * | 10/2003 | Turner | | 180/206.4 |
| 6,672,418 B1 * | 1/2004 | Makino | | 180/206.3 |
| 6,814,172 B1 * | 11/2004 | Vu | | 180/220 |
| 7,065,434 B2 * | 6/2006 | Uno | | 701/36 |
| 7,117,968 B2 * | 10/2006 | Ono et al. | | 180/220 |
| 7,150,339 B2 * | 12/2006 | Liao et al. | | 180/221 |
| 7,165,641 B2 * | 1/2007 | Kitamura | | 180/206.2 |
| 7,357,209 B2 * | 4/2008 | Kokatsu et al. | | 180/206.2 |
| 7,520,351 B2 * | 4/2009 | Uchisasai et al. | | 180/65.245 |
| 7,749,121 B2 * | 7/2010 | Perng | | 475/5 |
| 7,766,114 B2 * | 8/2010 | Lee et al. | | 180/206.4 |
| 7,949,442 B2 * | 5/2011 | Sheidler et al. | | 701/22 |
| 8,241,160 B2 * | 8/2012 | Jung et al. | | 475/4 |
| 8,256,554 B2 * | 9/2012 | Chan | | 180/206.4 |
| 8,646,560 B2 * | 2/2014 | Chan | | 180/206.3 |
| 8,777,804 B2 * | 7/2014 | Takachi | | 477/3 |
| 2002/0014366 A1 * | 2/2002 | Turner | | 180/220 |
| 2002/0109329 A1 * | 8/2002 | Wang | | 280/212 |
| 2002/0149874 A1 * | 10/2002 | Norman et al. | | 360/78.04 |
| 2004/0040375 A1 * | 3/2004 | Kadota et al. | | 73/116 |
| 2005/0016785 A1 * | 1/2005 | Young | | 180/205 |
| 2005/0140113 A1 * | 6/2005 | Kokatsu et al. | | 280/205 |
| 2006/0065460 A1 * | 3/2006 | Bui | | 180/220 |
| 2009/0200096 A1 * | 8/2009 | Pittman | | 180/205 |
| 2011/0144841 A1 * | 6/2011 | Ruben | | 701/22 |
| 2011/0144844 A1 * | 6/2011 | Ishibashi | | 701/22 |
| 2011/0160945 A1 * | 6/2011 | Gale | | 701/22 |
| 2011/0180341 A1 * | 7/2011 | Chan | | 180/206.4 |
| 2011/0183793 A1 * | 7/2011 | Chan | | 474/69 |
| 2011/0183794 A1 * | 7/2011 | Chan | | 474/70 |
| 2011/0183805 A1 * | 7/2011 | Chan | | 475/254 |
| 2012/0086380 A1 * | 4/2012 | Krieger et al. | | 318/497 |
| 2012/0086382 A1 * | 4/2012 | Peto | | 318/729 |
| 2012/0234118 A1 * | 9/2012 | Huang | | 74/325 |
| 2013/0006463 A1 * | 1/2013 | Yang et al. | | 701/22 |
| 2013/0054066 A1 * | 2/2013 | Watarai | | 701/22 |
| 2013/0054067 A1 * | 2/2013 | Shoge et al. | | 701/22 |
| 2013/0054068 A1 * | 2/2013 | Shoge | | 701/22 |
| 2013/0075176 A1 * | 3/2013 | Chan | | 180/206.4 |

* cited by examiner

ELECTRIC BICYCLE DRIVING APPARATUS

CROSS-REFERENCE TO RELATED APPLICATION

This application claims the benefit of Korean Patent Application No. 2012-0104169, filed on Sep. 19, 2012 in the Korean Intellectual Property Office, the disclosure of which is incorporated herein by reference.

BACKGROUND

1. Field

Embodiments of the present invention relate to an electric bicycle driving apparatus.

2. Description of the Related Art

In general, electric bicycle driving apparatuses are provided to drive electric bicycles.

Most conventional driving apparatuses for electric bicycles, in driving a motor of the electric bicycle in a low-speed or high-speed motor driving mode, have a limit to adaptation of a stepping operation of a pedal to a low-speed or high-speed motor driving mode.

Accordingly, numerous researches have been conducted on the electric bicycle capable of providing a motor driver with an optimum stepping operation by adaptively driving the pedal with a low-speed or high-speed motor driving mode in a state of the electric bicycle being stopped or in a state of the electric bicycle being running.

SUMMARY

Therefore, it is an aspect of the present invention to provide an electric bicycle capable of providing a motor driver with an optimum stepping operation by adaptively driving the pedal with a low-speed or high-speed motor driving mode in a state of the electric bicycle being stopped or in a state of the electric bicycle being running Additional aspects of the invention will be set forth in part in the description which follows and, in part, will be obvious from the description, or may be learned by practice of the invention.

In accordance with one aspect of the present invention, an electric bicycle driving apparatus includes a speed change mode operator, a controller, a generation-signal provider, a stepping operation load booster, and a stepping operation provider. The speed change mode operator may be configured to output a low-speed mode signal or a high-speed mode signal. The controller may be configured to receive the low-speed mode signal or high-speed mode signal output from the speed change mode operator and to output a first control signal corresponding to the low-speed mode signal or a second control signal corresponding to the high-speed mode signal. The generation-signal provider may be configured to provide a generation signal output from a generator. The stepping operation load booster may be configured to boost a load of the generation signal output from the generation-signal provider by receiving the first control signal or second control signal when the speed change mode operator outputs the low-speed mode signal or high-speed mode signal, and to send a stepping operation provider a resulting signal of the boost in a stepping operation signal corresponding to the low-speed mode signal or high-speed mode. The stepping operation provider may be configured to receive the stepping operation signal from the stepping operation load booster, and to output a stepping operation drive signal corresponding to the low-speed mode signal or high-speed mode signal so as to drive pedals to be adapted to the high-speed mode or low-speed mode.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

<First Embodiment>

Figure 1:
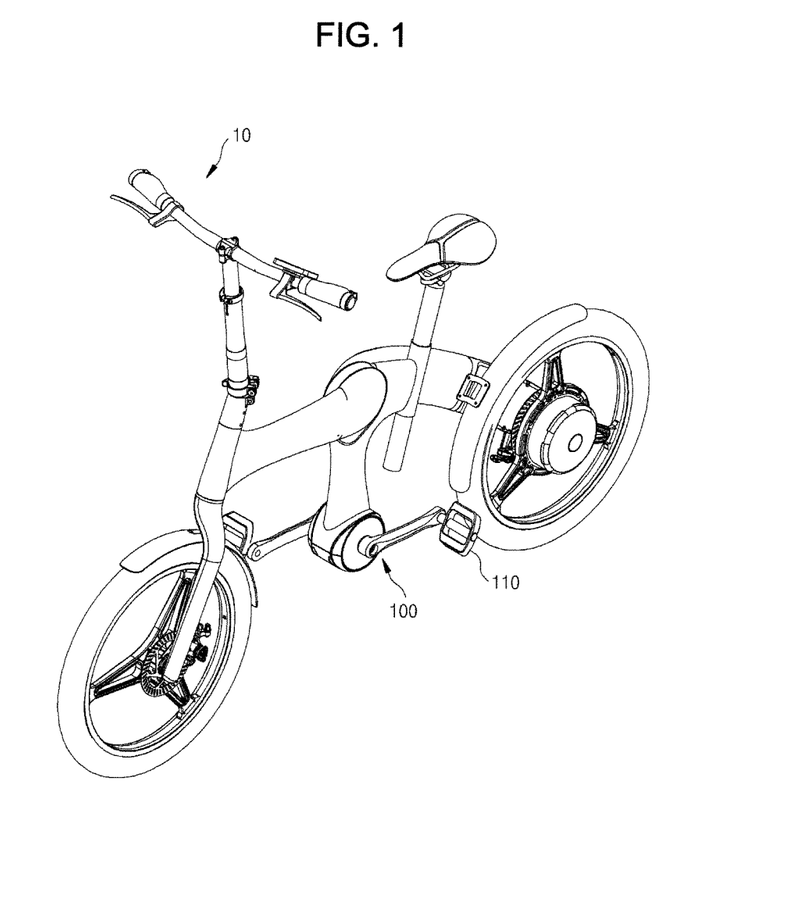
FIG. 1 is a perspective view illustrating an electric bicycle including an electric bicycle driving apparatus according to a first embodiment of the present invention.
Figure 2:
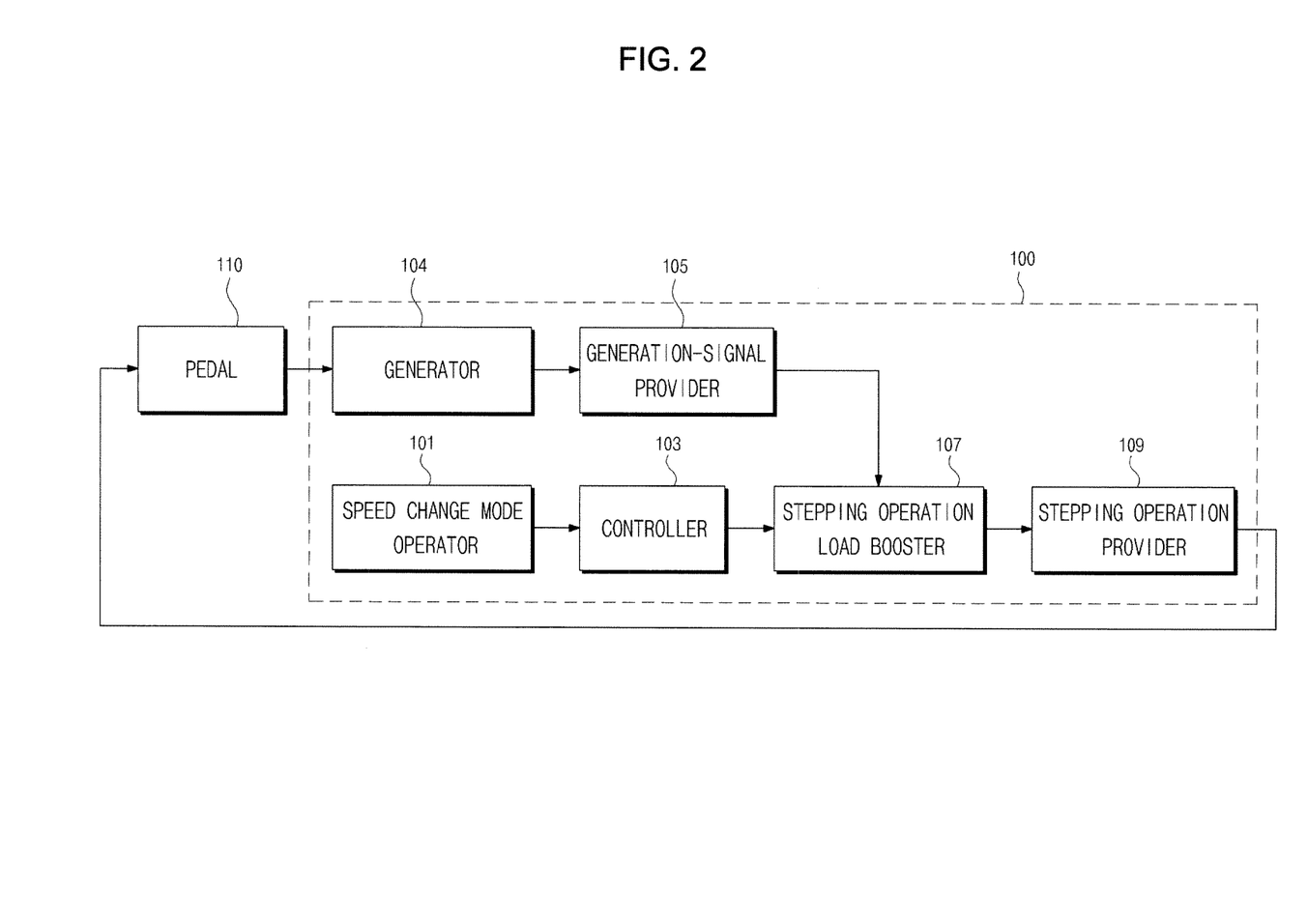
FIG. 2 is a block diagram illustrating a configuration of the electric bicycle driving apparatus according to the first embodiment of the present invention.

FIG. 1 is a perspective view illustrating an electric bicycle including an electric bicycle driving apparatus according to a first embodiment of the present invention, and FIG. 2 is a block diagram illustrating the configuration of the electric bicycle driving apparatus according to the first embodiment of the present invention.

Figure 3:
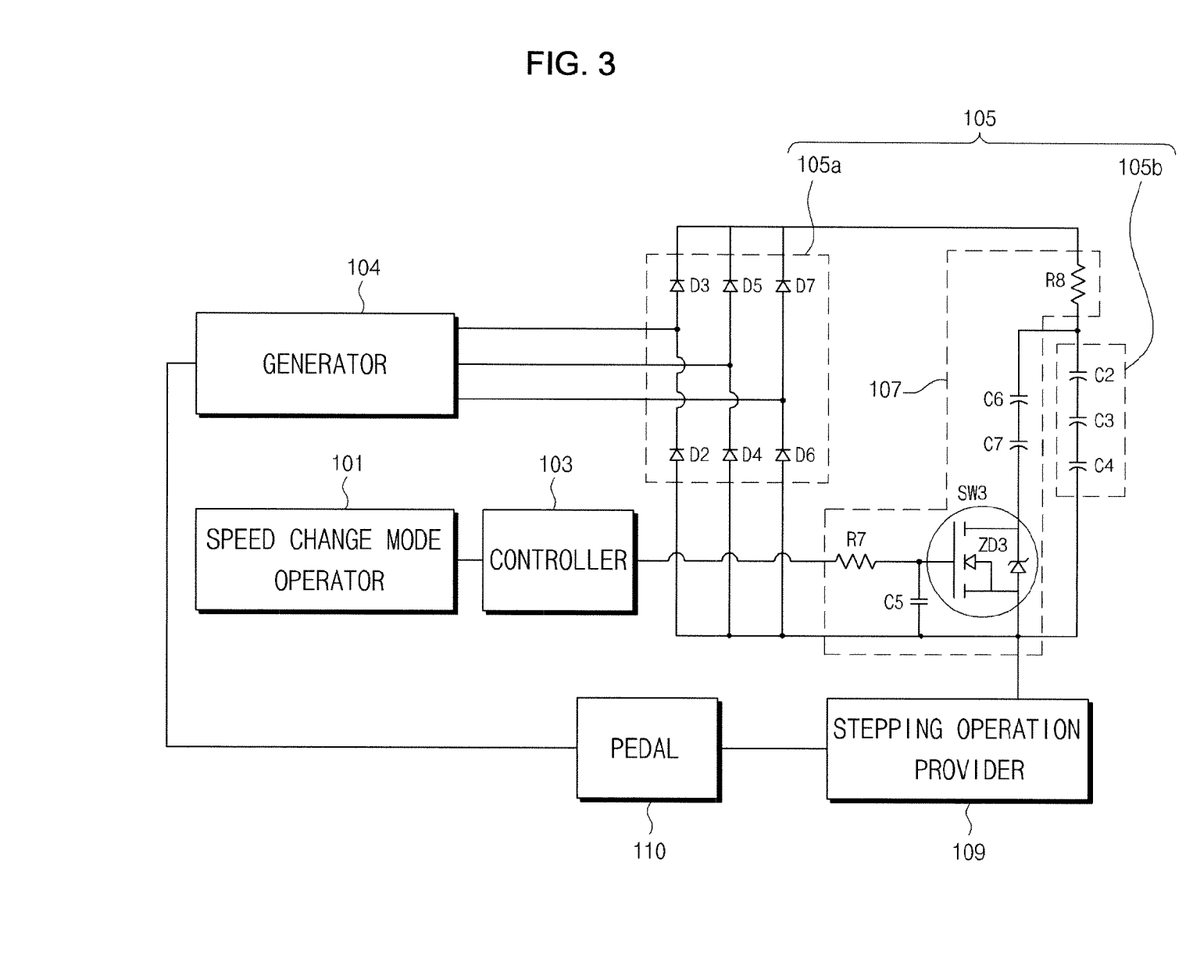
FIG. 3 is an equivalent circuit diagram illustrating an example of the electric bicycle driving apparatus according to the first embodiment of the present invention.

FIG. 3 is an equivalent circuit diagram illustrating an example of the electric bicycle driving apparatus according to the first embodiment of the present invention.

First, referring to FIG. 1, the electric bicycle driving apparatus according to the first embodiment of the present invention, denoted by reference numeral 100, is provided at one side and the other side of the electric bicycle, denoted by reference numeral 10.

Next, referring to FIGS. 2 and 3, the electric bicycle driving apparatus 100 according to the first embodiment of the present invention includes a speed change mode operator 101, a controller 103, a generation-signal provider 105, a stepping operation load booster 107, and a stepping operation provider 109.

The speed change mode operator 101 is provided to output a low-speed mode signal or a high-speed mode signal.

The speed change mode operator 101 may be provided at a portion of a handle bar of the electric bicycle 10.

The controller 103 receives the low-speed mode signal or high-speed mode signal output from the speed change mode operator 101, and outputs a first control signal corresponding to the low-speed mode signal or a second control signal corresponding to the high-speed mode signal.

The controller 103 may include an Electronic Controller Unit (ECU) or a Micro Controller Unit (MCU).

The generation-signal provider 105 is provided to provide a generation signal output from a generator 104.

The generation-signal provider 105 may include a generation-signal rectification part 105a and a generation-signal storage part 105b.

The generation-signal rectification part 105a may be electrically connected to the generator 104 to rectify the generation signal output from the generator 104.

The generation-signal rectification part 105a may include more than one second rectifying diode D2 and D3, more than one fourth rectifying diode D4 and D5, and more than one sixth rectifying diode D6 and D7.

The more than one second rectifying diode D2 and D3 may be electrically connected to one side of the generator 104, and the more than one fourth rectifying diode D4 and D5 may be electrically connected to another side of the generator 104.

The more than one second rectifying diode D2 and D3 may include a second rectifying diode D2 and a third rectifying diode D3 connected to each other in series.

The more than one fourth rectifying diode D4 and D5 may include a fourth rectifying diode D4 and a fifth rectifying diode D5 connected to each other in series.

The more than one sixth rectifying diode D6 and D7 may be electrically connected to the other side of the generator 104.

The more than one sixth rectifying diodes D6 and D7 may include a sixth rectifying diode D6 and a seventh rectifying diode D7 connected to each other in series.

The generation-signal storage part 105b may be electrically connected to the generation-signal rectification part 105a to store the generation signal rectified in the generation-signal rectification part 105a.

The generation-signal storage part 105b may include more than one second capacitor C2, C3 and C4, which is electrically connected to the generation-signal rectification part 105a and the motor-driver operating-signal regulator 107 that will be described hereinafter.

The more than one second capacitor C2, C3 and C4 may include a second capacitor C2, a third capacitor C3, and a fourth capacitor C4 connected to one another in series.

The more than one second capacitor C2, C3 and C4 may be a smoothing capacitor.

The stepping operation load booster 107 is configured to boost a load of a generation signal output from the generation-signal provider 105 by receiving a first control signal or second control signal when the speed change mode operator 101 outputs a low-speed mode signal or high-speed mode signal, and to send the stepping operation provider 109 a resulting signal of the boost in a stepping operation signal corresponding to the low-speed mode signal or high-speed mode.

Specifically, the stepping operation load booster 107 may include more than one seventh resistor R7, a third switching device SW3, more than one fifth capacitor C5, more than one eighth resistor R8, and more than one sixth capacitor C6.

The more than one seventh resistor R7 may be electrically connected to the controller 103, and the third switching device SW3 may be electrically connected to the more than one seventh resistor R7 and the stepping operation provider 109.

The third switching device SW3 may include at least one of a Metal-Oxide Semiconductor Field Effect Transistor (MOSFET) and a Bipolar Junction Transistor (BJT).

The third switching device SW3 may include more than one zener diode ZD3 electrically connected to the stepping operation provider 109 and the more than one sixth capacitor C6 and C7 to cut off an abnormal signal from the stepping operation provider 109.

The more than one fifth capacitor C5 may be electrically connected to the more than one seventh resistor R7 and the third switching device SW3, and the more than one eighth resistor R8 may be electrically connected to the generation-signal provider 105.

The more than one fifth capacitor C5 may store the first control signal or the second control signal, respectively corresponding to the low speed mode signal and the high speed mode signal that are output from the controller 103, for a predetermined time, and then provide the stored signal to the third switching device SW3 upon change to a corresponding speed mode between the low speed mode and the high speed mode.

The more than one sixth capacitor C6 and C7 may be electrically connected to the more than one eighth resistor R8 and the third switching device SW3.

The more than one sixth capacitor C6 and C7 may include a sixth capacitor C6 and a seventh capacitor C7 connected to each other in series.

The more than one sixth capacitor C6 and C7 may be a smoothing capacitor.

The stepping operation load booster 107 creates a first current-path between the more than one seventh resistor R7 and the more than one fifth capacitor C5, and a second current-path between the more than one eighth resistor R8 and the more than one sixth capacitor C6 and C7, thereby sending the stepping operation provider 109, which is to be described later, a boosted load in a stepping operation signal corresponding to the low speed mode signal or the high speed mode signal.

The stepping operation provider 109 may receive the stepping operation signal from the stepping operation load booster 107, and output a stepping operation drive signal corresponding to the low-speed mode signal or high-speed mode signal so as to drive pedals 110 to be adapted to the high-speed mode or low-speed mode.

Hereinafter, a method to drive the electric bicycle 10 using the electric bicycle driving apparatus 100 according to the first embodiment of the present invention will be described.

First, the method to drive the electric bicycle 10 using the electric bicycle driving apparatus 100 according to the first embodiment of the present invention includes outputting a low-speed mode signal or high-speed mode signal from the speed change mode operator 101.

Thereafter, the method to drive the electric bicycle 10 using the electric bicycle driving apparatus 100 according to the first embodiment of the present invention includes, at the stepping operation load booster 107, boosting a load of a generation signal output from the generation-signal provider 105 by receiving a first control signal or second control signal from the controller 103, and then sending the stepping operation provider 109 a resulting signal of the boost in a stepping operation signal corresponding to the low-speed mode signal or high-speed mode.

Finally, the method to drive the electric bicycle 10 using the electric bicycle driving apparatus 100 according to the first embodiment of the present invention includes, at the stepping operation provider 109, receiving the stepping operation signal from the stepping operation load booster 107, and outputting a stepping operation drive signal corresponding to the low-speed mode signal or high-speed mode signal so as to drive pedals 110 to be adapted to the high-speed mode or low-speed mode.

The electric bicycle driving apparatus 100 according to the first embodiment of the present invention includes the speed change mode operator 101, the controller 103, the generation-signal provider 105, the stepping operation load booster 107, and the stepping operation provider 109.

Accordingly, the electric bicycle driving apparatus 100 according to the first embodiment of the present invention may provide a motor driver with an optimum stepping operation by adaptively driving the pedal with a low-speed or high-speed motor driving mode in a state of the electric bicycle being stopped or in a state of the electric bicycle being running.

<Second Embodiment>

Figure 4:
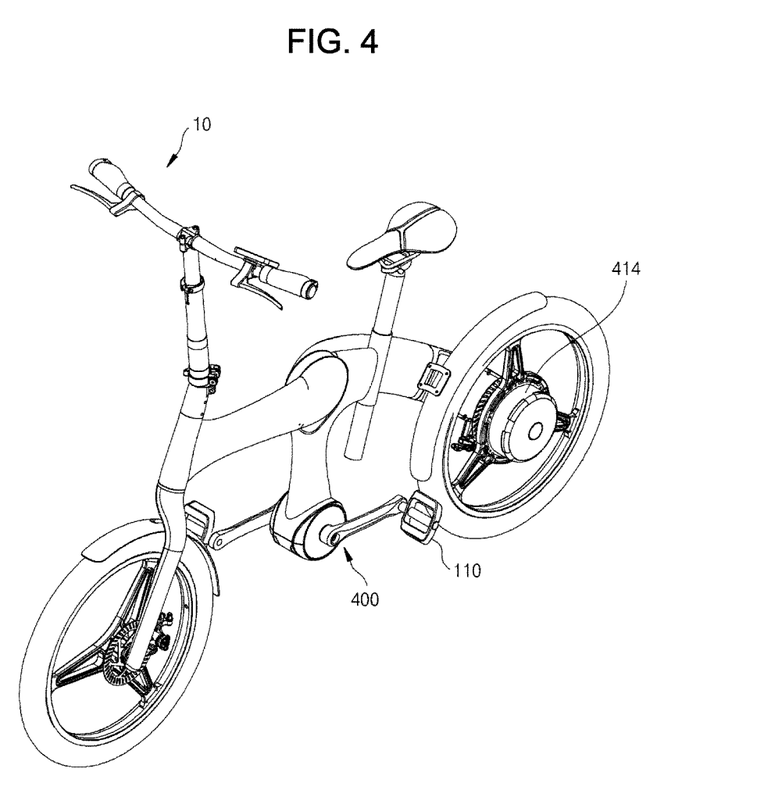
FIG. 4 is a perspective view illustrating an electric bicycle including an electric bicycle driving apparatus according to a second embodiment of the present invention.
Figure 5:
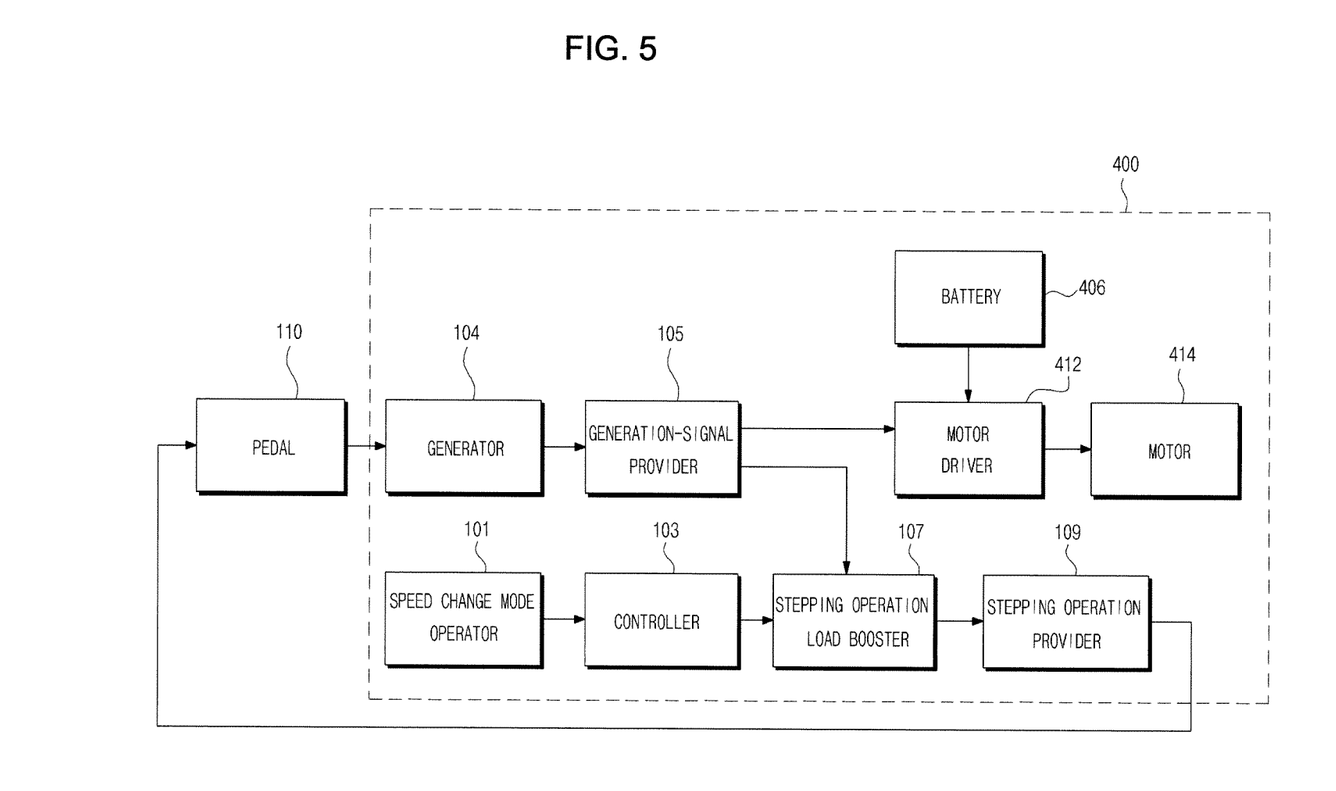
FIG. 5 is a block diagram illustrating the configuration of the electric bicycle driving apparatus according to the second embodiment of the present invention.

FIG. 4 is a perspective view illustrating an electric bicycle including an electric bicycle driving apparatus according to a second embodiment of the present invention, and FIG. 5 is a block diagram illustrating the configuration of the electric bicycle driving apparatus according to the second embodiment of the present invention.

Figure 6:
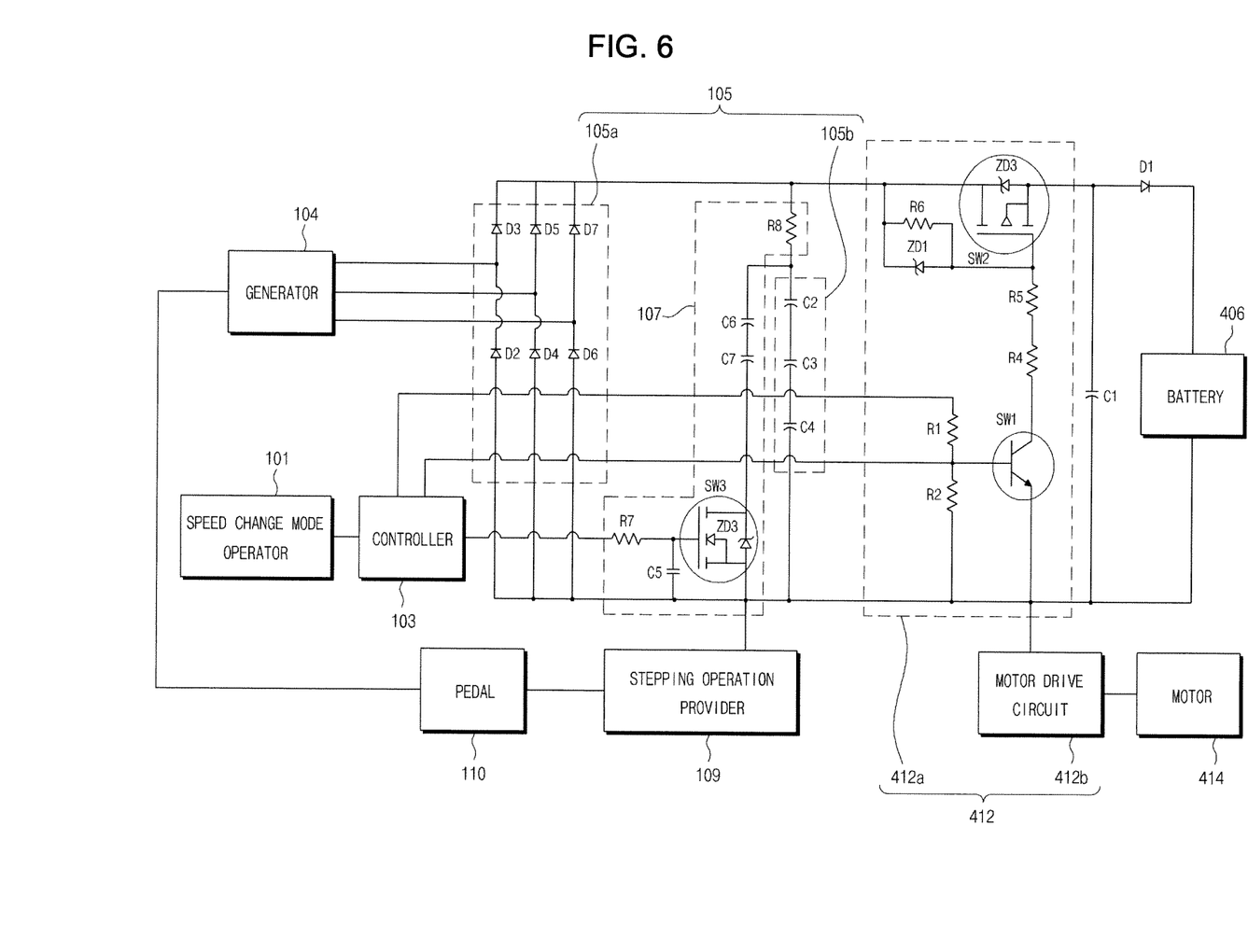
FIG. 6 is an equivalent circuit diagram of another example of the electric bicycle driving apparatus according to the second embodiment of the present invention.

FIG. 6 is an equivalent circuit diagram illustrating an example of the electric bicycle driving apparatus according to the second embodiment of the present invention.

Referring to FIG. 4, an electric bicycle driving apparatus 400 according to the second embodiment of the present invention is provided at either side of the electric bicycle 10.

Referring to FIGS. 5 and 6, the electric bicycle driving apparatus 400 according to the second embodiment of the present invention includes the speed change mode operator 101, the controller 103, the generation-signal provider 105, a battery 406, the stepping operation load booster 107, the stepping operation provider 109, a motor driver 412, and a motor 414.

The speed change mode operator 101 outputs a low-speed mode signal or high-speed mode signal.

The speed change mode operator 101 may be installed to the handle of the electric bicycle 10.

The controller 103 receives the low-speed mode signal or high-speed mode signal output from the speed change mode operator 101, and outputs a first control signal corresponding to the low-speed mode signal or a second control signal corresponding to the high-speed mode signal.

The controller 103 may include an ECU or an MCU.

The generation-signal provider 105 is for provision of a generation signal output from the generator 104.

The generation-signal provider 105 may include the generation-signal rectification part 105a and the generation-signal storage part 105b.

The generation-signal rectification part 105a may be electrically connected to the generator 104 to rectify the generation signal output from the generator 104.

The generation-signal rectification part 105a may include the more than one second rectifying diode D2 and D3, more than one fourth rectifying diode D4 and D5, and more than one sixth rectifying diode D6 and D7.

The more than one second rectifying diode D2 and D3 may be electrically connected to one side of the generator 104, and the more than one fourth rectifying diode D4 and D5 may be electrically connected to another side of the generator 104.

The more than one second rectifying diode D2 and D3 may include the second rectifying diode D2 and third rectifying diode D3 connected to each other in series.

The more than one fourth rectifying diode D4 and D5 may include the fourth rectifying diode D4 and fifth rectifying diode D5 connected to each other in series.

The more than one sixth rectifying diode D6 and D7 may be electrically connected to the other side of the generator 104.

The more than one sixth rectifying diode D6 and D7 may include the sixth rectifying diode D6 and seventh rectifying diode D7 connected to each other in series.

The generation-signal storage part 105b may be electrically connected to the generation-signal rectification part 105a to store the generation signal rectified in the generation-signal rectification part 105a.

The generation-signal storage part 105b may include more than one second capacitor C2, C3 and C4, which is electrically connected to the generation-signal rectification part 105a and the stepping operation load booster 107.

The more than one second capacitor C2, C3 and C4 may include the second capacitor C2, third capacitor C3, and fourth capacitor C4 connected to one another in series.

The more than one second capacitor C2, C3 and C4 may be a smoothing capacitor.

The stepping operation load booster 107 is configured to boost a load of a generation signal output from the generation-signal provider 105 by receiving a first control signal or second control signal when the speed change mode operator 101 outputs a low-speed mode signal or high-speed mode signal, and to send the stepping operation provider 109, which is to be described later, the boosted load in a stepping operation signal corresponding to the low-speed mode signal or high-speed mode.

Specifically, the stepping operation load booster 107 may include more than one seventh resistor R7, a third switching device SW3, more than one fifth capacitor C5, more than one eighth resistor R8, and more than one sixth capacitor C6.

The more than one seventh resistor R7 may be electrically connected to the controller 103, and the third switching device SW3 may be electrically connected to the more than one seventh resistor R7 and the stepping operation provider 109.

The third switching device SW3 may include at least one of a Metal-Oxide Semiconductor Field Effect Transistor (MOSFET) and a Bipolar Junction Transistor (BJT).

The third switching device SW3 may include more than one zener diode ZD3 electrically connected to the stepping operation provider 109 and the more than one sixth capacitor C6 and C7 to cut off an abnormal signal from the stepping operation provider 109.

The more than one fifth capacitor C5 may be electrically connected to the more than one seventh resistor R7 and the third switching device SW3, and the more than one eighth resistor R8 may be electrically connected to the generation-signal provider 105.

The more than one fifth capacitor C5 may store the first control signal or the second control signal, respectively corresponding to the low speed mode signal and the high speed mode signal that are output from the controller 103, for a predetermined time, and then provide the stored signal to the third switching device SW3 upon change to a corresponding speed mode between the low speed mode and the high speed mode.

The more than one sixth capacitor C6 and C7 may be electrically connected to the more than one eighth resistor R8 and the third switching device SW3.

The more than one sixth capacitor C6 and C7 may include a sixth capacitor C6 and a seventh capacitor C7 connected to each other in series.

The more than one sixth capacitor C6 and C7 may be a smoothing capacitor.

The stepping operation load booster 107 creates a first current-path between the more than one seventh resistor R7 and the more than one fifth capacitor C5, and a second current-path between the more than one eighth resistor R8 and the more than one sixth capacitor C6 and C7, thereby sending the stepping operation provider 109, which is to be described later, a boosted load in a stepping operation signal corresponding to the low speed mode signal or the high speed mode signal.

The stepping operation provider 109 may receive the stepping operation signal from the stepping operation load booster 107, and output a stepping operation drive signal corresponding to the low-speed mode signal or high-speed mode signal so as to drive pedals 110 to be adapted to the high-speed mode or low-speed mode.

The motor driver 412 may be electrically connected to the generation-signal provider 105 to receive the generation signal from the generation-signal provider 105 and to receive power of a battery, thereby driving the motor 414.

The motor driver 412 may be a three-phase motor driver.

Specifically, the motor driver 412 may include a motor-driver operating signal regulating circuit 412a and a motor drive circuit 412b.

The motor-driver operating signal regulating circuit 412a may include the first switching device SW1, more than one first resistor R1 and R2, more than one fourth resistance R4, R5 and R6, and second switching device SW2.

The first switching device SW1 may be electrically connected to one side of the controller 103, and the more than one first resistor R1 and R2 may be electrically connected to the other side of the controller 103 and the first switching device SW1.

The more than one first resistor R1 and R2 may include the first resistor R1 and second resistor R2 for dividing voltage.

The first switching device SW1 may include at least one of an MOSFET and a BJT. The more than one fourth resistor R4, R5 and R6 may be electrically connected to the first switching device SW1, and the second switching device SW2 may be electrically connected to the generation-signal provider 105 and the more than one fourth resistor R4, R5 and R6.

The more than one fourth resistor R4, R5 and R6 may include a fourth resistor R4, a fifth resistor R5, and a sixth resistor R6 for dividing voltage.

The second switching device SW2 may include at least one of a Metal-Oxide Semiconductor Field Effect Transistor (MOSFET) and a Bipolar Junction Transistor (BJT).

The second switching device SW2 may include more than one zener diode ZD2 electrically connected to the generation-signal provider 105 and the more than one fourth resistor R4, R5 and R6 to cut off an abnormal signal from the first switching device SW1.

The motor-driver operating signal regulating circuit 412a may include more than one zener diode ZD1 electrically connected to the generation signal provider 105 and the more than one fourth resistor R4, R5 and R6 to cut off an abnormal signal from the first switching device SW 1.

That is, the more than one zener diode ZD1 is electrically connected to the generation-signal provider 105 and one resistor R6 among the more than one fourth resistor R4, R5 and R6 to cut off an abnormal signal transmitted from the first switching device SW1.

The motor-driver operating signal regulating circuit 412a creates a first current-path among the more than one fourth resistor R4, R5 and R6. When the speed change mode operator 105 outputs a low-speed mode signal or high-speed mode signal, the motor-driver operating-signal regulating circuit 412a receives a first control signal or second control signal from the controller 103, turning on the first switching device SW1. The motor-driver operating-signal regulating circuit 412a also creates a second current-path among the more than one fourth resistor R4, R5 and R6 to thereby turn on the second switching device SW2. As such, the motor-driver operating-signal regulating circuit 412a may regulate the level of generation signal from the generation-signal provider 105 via the more than one fourth resistor R4, R5 and R6, so as to lower the level of generation signal to be transmitted to the motor drive circuit 412b that is operated upon receiving power of the battery 406.

The more than one capacitor C1 may be electrically connected to the second switching device SW2, the first switching device SW1 and battery 406.

The more than one capacitor C1 may be a smoothing capacitor.

The more than one capacitor C1 may temporarily store the regulated generation signal, and then provide the signal to the motor 414 at an operating time of the motor drive circuit 412b.

The more than one capacitor C1 may remove a noise signal from the regulated generation signal, and provide the resulting signal to the motor 414.

The more than one rectifying diode D1 may be electrically connected to the second switching device SW2, more than one capacitor C1 and battery 406, to rectify power output from the battery 406 and apply the power to the motor drive circuit 412b.

Hereinafter, a method to drive the electric bicycle 10 using the electric bicycle driving apparatus 400 according to the second embodiment of the present invention will be described.

First, the method to drive the electric bicycle 10 using the electric bicycle driving apparatus 400 according to the second embodiment of the present invention includes outputting a low-speed mode signal or high-speed mode signal from the speed change mode operator 101.

Thereafter, the method to drive the electric bicycle 10 using the electric bicycle driving apparatus 400 according to the second embodiment of the present invention includes, at the stepping operation load booster 107, boosting a load of a generation signal output from the generation-signal provider 105 by receiving a first control signal or second control signal from the controller 103, and then sending the stepping operation provider 109 a resulting signal of the boost in a stepping operation signal corresponding to the low-speed mode signal or high-speed mode.

Finally, the method to drive the electric bicycle 10 using the electric bicycle driving apparatus 400 according to the second embodiment of the present invention includes, at the stepping operation provider 109, receiving the stepping operation signal from the stepping operation load booster 107, and outputting a stepping operation drive signal corresponding to the low-speed mode signal or high-speed mode signal so as to drive pedals 110 to be adapted to the high-speed mode or low-speed mode.

Meanwhile, another example of a method to drive the electric bicycle 10 using the electric bicycle driving apparatus 400 according to the second embodiment of the present invention will be described.

First, the method to drive the electric bicycle 10 using the electric bicycle driving apparatus 400 according to the second embodiment of the present invention includes outputting a low-speed mode signal or high-speed mode signal from the speed change mode operator 101.

Thereafter, the method to drive the electric bicycle 10 using the electric bicycle driving apparatus 400 according to the second embodiment of the present invention includes, at the motor driver 412, receiving a generation signal from the generation signal provider 105 and receiving power of the battery 406, thereby driving the motor 414.

Thereafter, the method to drive the electric bicycle 10 using the electric bicycle driving apparatus 400 according to the second embodiment of the present invention includes, at the stepping operation load booster 107, boosting a load of a generation signal output from the generation-signal provider 105 by receiving a first control signal or second control signal from the controller 103, and then sending the stepping operation provider 109 a resulting signal of the boost in a stepping operation signal corresponding to the low-speed mode signal or high-speed mode.

Finally, the method to drive the electric bicycle 10 using the electric bicycle driving apparatus 400 according to the second embodiment of the present invention includes, at the stepping operation provider 109, receiving the stepping operation signal from the stepping operation load booster 107, and outputting a stepping operation drive signal corresponding to the low-speed mode signal or high-speed mode signal so as to drive pedals 110 to be adapted to the high-speed mode or low-speed mode.

The electric bicycle driving apparatus 400 according to the second embodiment of the present invention includes the speed change mode operation 101, the controller 103, the generation signal provider 105, the stepping operation load booster 107, the stepping operation provider 109, the motor driver 412 and the motor 414.

Accordingly, the electric bicycle driving apparatus 400 according to the second embodiment of the present invention can provide a motor driver with an optimum stepping operation by adaptively driving the pedal with a low-speed or high-speed motor driving mode in a state of the electric bicycle being stopped or in a state of the electric bicycle being running.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric bicycle driving apparatus comprising:
a speed change mode operator to output a low-speed mode signal or a high-speed mode signal;
a controller to receive the low-speed mode signal or high-speed mode signal output from the speed change mode operator and to output a first control signal corresponding to the low-speed mode signal or a second control signal corresponding to the high-speed mode signal;
a generation-signal provider to provide a generation signal output from a generator;
a stepping operation load booster to boost a load of the generation signal output from the generation-signal provider by receiving the first control signal or second control signal when the speed change mode operator outputs the low-speed mode signal or high-speed mode signal, and to send a stepping operation provider a resulting signal of the boost in a stepping operation signal corresponding to the low-speed mode signal or high-speed mode; and
the stepping operation provider to receive the stepping operation signal from the stepping operation load booster, and to output a stepping operation drive signal corresponding to the low-speed mode signal or high-speed mode signal so as to drive pedals to be adapted to the high-speed mode or low-speed mode.

2. The apparatus according to claim 1, wherein the stepping operation load booster includes:

more than one seventh resistor electrically connected to the controller;
a third switching device electrically connected to the more than one seventh resistor and the stepping operation provider;
more than one fifth capacitor electrically connected to the more than one seventh resistor and the third switching device;
more than one eighth resistor electrically connected to the generation-signal provider; and
more than one sixth capacitor electrically connected to the more than one eighth resistor and the third switching device.

3. The apparatus according to claim 2, wherein the third switching device includes more than one zener diode electrically connected to the stepping operation provider and the more than one sixth capacitor.

4. The apparatus according to claim 2, wherein the more than one sixth capacitor includes a sixth capacitor and a seventh capacitor connected to each other in series.

5. The apparatus according to claim 2, wherein the more than one sixth capacitor is a smoothing capacitor.

6. The apparatus according to claim 1, wherein the generation-signal provider includes:
a generation-signal rectification part electrically connected to the generator to rectify the generation signal output from the generator; and
a generation-signal storage part electrically connected to the generation-signal rectification part to store the generation signal rectified in the generation-signal rectification part.

7. The apparatus according to claim 6, wherein the generation-signal rectification part includes:
more than one second rectifying diode electrically connected to one side of the generator;
more than one fourth rectifying diode electrically connected to another side of the generator; and
more than one sixth rectifying diode electrically connected to the other side of the generator.

8. The apparatus according to claim 7, wherein the more than one second rectifying diode includes a second rectifying diode and a third rectifying diode connected to each other in series.

9. The apparatus according to claim 7, wherein the more than one fourth rectifying diode includes a fourth rectifying diode and a fifth rectifying diode connected to each other in series.

10. The apparatus according to claim 7, wherein the more than one sixth rectifying diode includes a sixth rectifying diode and a seventh rectifying diode connected to each other in series.

11. The apparatus according to claim 6, wherein the generation-signal storage part includes more than one second capacitor electrically connected to the generation-signal rectification part and the stepping operation load booster.

12. The apparatus according to claim 11, wherein the more than one second capacitor includes a second capacitor, a third capacitor and a fourth capacitor connected to one another in series.

13. The apparatus according to claim 11, wherein the more than one second capacitor is a smoothing capacitor.

14. The apparatus according to claim 1, further comprising a motor driver electrically connected to the generation-signal provider to receive the generation signal from the generation-signal provider and to receive power of a battery, thereby driving a motor, wherein the motor driver includes a motor-driver operating signal regulating circuit and a motor drive circuit,
wherein the motor-driver operating signal regulating circuit includes:
a first switching device electrically connected to one side of the controller;
more than one first resistor electrically connected to another side of the controller and the first switching device;
more than one fourth resistor electrically connected to the first switching device; and
a second switching device electrically connected to the generation-signal provider and the more than one fourth resistor.

15. The apparatus according to claim 14, wherein the more than one first resistor includes a first resistor and a second resistor for dividing voltage.

16. The apparatus according to claim 14, wherein the more than one fourth resistor includes a fourth resistor, a fifth resistor, and a sixth resistor dividing voltage.

17. The apparatus according to claim 14, further comprising more than one zener diode electrically connected to the generation-signal provider and the more than one fourth resistor.

18. The apparatus according to claim 14, wherein the second switching device includes more than one zener diode electrically connected to the generation-signal provider and the more than one fourth resistor.

19. The apparatus according to claim 14, wherein further comprising more than one capacitor electrically connected to the second switching device, the first switching device and the battery.

20. The apparatus according to claim 19, wherein the more than one capacitor is a smoothing capacitor.

21. The apparatus according to claim 19, further comprising more than one rectifying diode electrically connected to the second switching device, the more than one capacitor and the battery.

* * * * *